United States Patent
Movva et al.

(10) Patent No.: US 12,301,550 B2
(45) Date of Patent: May 13, 2025

(54) END-TO-END ENCRYPTION FOR LOCATION SHARING

(71) Applicant: Apple Inc., Cupertino, CA (US)

(72) Inventors: Siva Ganesh Movva, San Jose, CA (US); Raghunandan K. Pai, Saratoga, CA (US); Scott Lopatin, San Jose, CA (US); Swadesh Bhattacharya, Sunnyvale, CA (US); Sarish Jain, Cupertino, CA (US); Aashish Patil, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 281 days.

(21) Appl. No.: 17/742,357

(22) Filed: May 11, 2022

(65) Prior Publication Data

US 2022/0385643 A1 Dec. 1, 2022

Related U.S. Application Data

(60) Provisional application No. 63/195,676, filed on Jun. 1, 2021.

(51) Int. Cl.
*H04L 29/00* (2006.01)
*H04L 9/08* (2006.01)
*H04L 9/40* (2022.01)

(52) U.S. Cl.
CPC ........ *H04L 63/0442* (2013.01); *H04L 9/0825* (2013.01); *H04L 63/08* (2013.01); *H04L 63/16* (2013.01)

(58) Field of Classification Search
CPC ... H04L 63/0442; H04L 9/0825; H04L 63/08; H04L 63/16; H04L 9/0827; H04L 63/083
See application file for complete search history.

(56) References Cited

U.S. PATENT DOCUMENTS

| | | | |
|---|---|---|---|
| 10,349,211 B1 * | 7/2019 | Do | H04W 4/029 |
| 10,638,280 B2 | 4/2020 | Shan et al. | |
| 2018/0114219 A1 * | 4/2018 | Setchell | H04L 9/3226 |
| 2019/0012467 A1 * | 1/2019 | Richardson | H04W 12/068 |
| 2020/0067711 A1 * | 2/2020 | Abadir | H04L 9/3247 |
| 2022/0270096 A1 * | 8/2022 | Bhasin | H04L 63/0442 |

* cited by examiner

*Primary Examiner* — Ghazal B Shehni
(74) *Attorney, Agent, or Firm* — BAKERHOSTETLER

(57) ABSTRACT

A device implementing end-to-end encryption for location sharing may include at least one processor configured to generate a public-private keypair. The at least one processor may be further configured to encrypt, using a first key of the public-private keypair, location data corresponding to a location of the electronic device. The at least one processor may be further configured to transmit, to a server, the encrypted location data for storage. The at least one processor may be further configured to transmit, via a secure communication channel, a second key of the public-private keypair to another electronic device for subsequent retrieval of the encrypted location data by the other electronic device.

21 Claims, 5 Drawing Sheets

END-TO-END ENCRYPTION FOR LOCATION SHARING

CROSS REFERENCE TO RELATED APPLICATIONS

This application claims the benefit of priority to U.S. Provisional Patent Application No. 63/195,676, entitled, "End-To-End Encryption For Location Sharing", filed on Jun. 1, 2021, the disclosure of which is hereby incorporated herein in its entirety.

TECHNICAL FIELD

The present description relates generally to location sharing, including using end-to-end encryption for location sharing.

BACKGROUND

A user of an electronic device may request to share their location with another user of another electronic device. Consequently, location data corresponding to the location of the electronic device of the user may be transmitted to the other electronic device of the other user.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
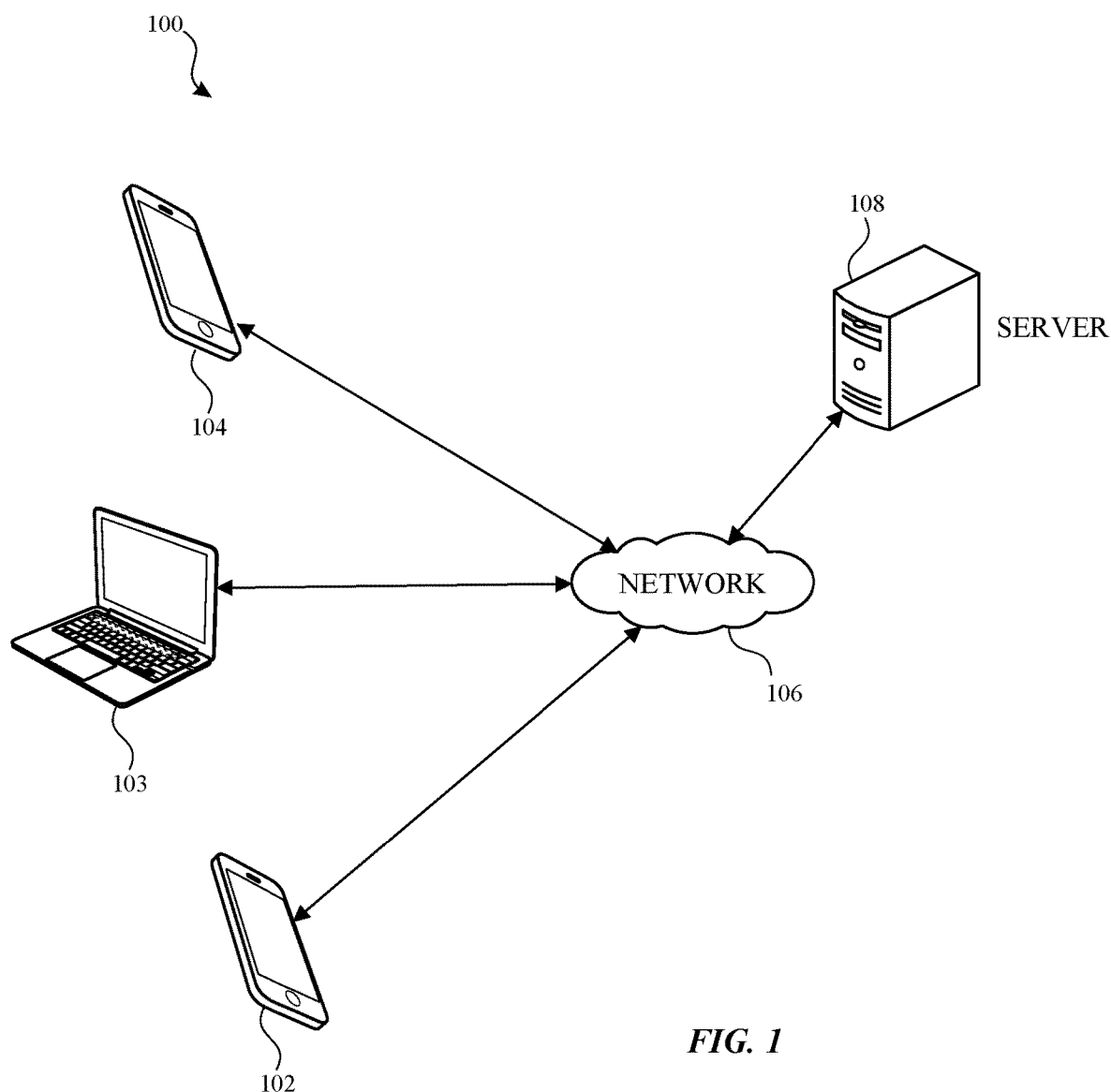
FIG. 1 illustrates an example network environment for end-to-end encryption for location sharing in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Users of electronic devices may wish to share their locations with one another. Accordingly, an electronic device of a first user may transmit location and/or positioning information (e.g., corresponding to the location/position of the electronic device and ostensibly the first user) to the electronic device of a second user. The electronic device of the second user may receive the location and/or positioning information and may responsively perform one or more actions, such as displaying, to the second user, an indication of the location of the first user.

In some examples, the electronic device of the first user may periodically (and/or aperiodically) transmit the location and/or positioning information to a server. The server may cache the location and/or positioning information for subsequent retrieval by the second electronic device, such as when the second user requests to access the location of the first user. In this manner, some location information is available on-demand to the second electronic device without having to query, and wait for a response from, the first electronic device. However, when the location and/or positioning information is transmitted in the clear (e.g., without encryption) from the electronic device of the first user to the server, and/or from the server to the electronic device of the second user, the location and/or positioning information may be intercepted by one or more intermediate devices and/or the location and/or positioning information may be accessible to the server.

In the subject system of end-to-end encryption for location sharing, the electronic device of the first user generates a public-private keypair and transmits, via a secure communication channel, a first key of the public-private keypair to the electronic device of the second user (and/or to electronic devices of one or more other users with whom the first user has chosen to share their location). The electronic device of the first user then uses a second key of the public-private keypair to periodically and/or aperiodically encrypt location and/or positioning information and transmits the encrypted location and/or positioning information to a server for subsequent retrieval by the electronic device of the second user. In one or more implementations, the electronic device of the first user may authenticate with the server using one or more credentials corresponding to a user account of the first user and/or may sign the encrypted location and/or positioning information using a private key. In this manner, the electronic devices of other users are not able to transmit, to the server, location information that is attributable to the electronic device of the first user.

The electronic device of the second user may subsequently retrieve the encrypted location and/or positioning information from the server and may decrypt the encrypted location and/or positioning information using the first key of the public-private keypair received from the electronic device of the first user. In this manner, the subject system provides for end-to-end encryption for location sharing thereby preventing location and/or positioning information shared between electronic devices from being intercepted by intermediary devices while also allowing for the location and/or positioning information to be cached (e.g., temporarily) at a server without the server being able to access the location and/or positioning information.

FIG. 1 illustrates an example network environment 100 for end-to-end encryption for location sharing in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103, and 104, a network 106 and a server 108. The network 106 may communicatively (directly or indirectly) couple, for example, any two or more of the electronic devices 102-104 and/or the server 108. In one or more implementations, the network 106 may be an interconnected network of devices that may include, and/or may be communicatively coupled to, the Internet. For explanatory purposes, the network environment 100 is illustrated in FIG. 1 as including electronic devices 102-104 and a single server 108; however, the network environment 100 may include any number of electronic devices and any number of servers.

The server 108 may be, and/or may include all or part of the electronic system discussed below with respect to FIG. 5. The server 108 may include one or more server devices and/or server instances, such as a cloud of servers, that may be used to facilitate end-to-end encryption for location sharing between the electronic devices 102-104. For explanatory purposes, a single server 108 is shown and discussed with respect to various operations, such as facilitating end-to-end encryption for location sharing. However, these and other operations discussed herein may be performed by one or more servers, and each different operation may be performed by the same or different servers.

One or more of the electronic devices 102-104 may be, for example, a portable computing device such as a laptop computer, a smartphone, a smart speaker, a peripheral device (e.g., a digital camera, headphones), a tablet device, a wearable device such as a smartwatch, a band, and the like, or any other appropriate device that includes, for example, one or more wireless interfaces, such as WLAN (e.g., Wi-Fi) radios, cellular radios, Bluetooth radios, Zigbee radios, near field communication (NFC) radios, and/or other wireless radios. In FIG. 1, by way of example, the electronic devices 102 and 104 are each depicted as a smartphone and the electronic device 103 is depicted as a laptop computer. Each of the electronic devices 102-104 may be, and/or may include all or part of, the device discussed below with respect to FIG. 2, and/or the electronic system discussed below with respect to FIG. 5.

In one or more implementations, one or more of the electronic devices 102-104 may be registered to, and/or associated with, a user account of a user, such as a user account with (and/or managed by) the server 108 and/or an entity associated therewith. In one or more implementations, two or more of the electronic devices 102-104 may be registered to and/or associated with the same user account and/or different user accounts.

In the subject system, a first user of one of the electronic devices 102-104 (e.g., the user corresponding to a first user account that the one of the electronic devices 102-104 is registered to), such as the electronic device 102, may select to share their location with other users and/or user accounts corresponding to other electronic devices, such as the electronic devices 103-104. For example, the first user may select to share their location with contacts, family members, and/or other specific users and/or user accounts. In one or more implementations a user of another electronic device 103 may transmit a request to the electronic device 102 requesting to receive the location of the first user, and the first user may approve the request responsive thereto.

Upon selecting to share their location with one or more other users and/or user accounts (and/or any time before or thereafter), the electronic device 102 of the first user may generate a public-private keypair (and/or a symmetric encryption key). The electronic device 102 may then transmit, via a secure communication channel, a first key of the public-private keypair (e.g., the public key or the private key of the keypair) to the other electronic devices 103-104 corresponding to the users and/or user accounts that the first user selected to share their location with. In one or more implementations, one or more of the secure communication channels may be end-to-end encrypted channels previously established between the electronic device 102 and one or more of the other electronic devices 103-104 (e.g., using a public-private key exchange), one or more of the secure communication channels may be direct (e.g., peer-to-peer) communication channels established between the electronic device 102 and one or more other of the electronic devices 103-104, and/or one or more of the secure communication channels may be any form of a secure communication channel.

The electronic device 102 may then use the second (e.g., other) key of the public-private keypair (e.g., the other of the public key or the private key) to encrypt location and/or positioning information corresponding to a current location of the electronic device 102 (such as based on a positioning system (GPS, GLONASS, etc.), and/or based on any other manner of determining location and/or positioning), and may transmit the encrypted location and/or positioning information (and/or identifying information corresponding to the first user and/or first user account) to the server 108 for temporary storage (and/or caching) in a secure dataspace specific to the first user account and for subsequent retrieval and decryption by one or more of the other electronic devices 103-104, such as by using the first key.

In one or more implementations, the electronic device 102 may transmit the encrypted location and/or positioning information periodically and/or aperiodically, such as based on one or more triggers and/or triggering events. The triggering events may include, for example, a change in the location of the electronic device that satisfies a change threshold, an expiration of an amount of time since transmitting the encrypted location data to the server 108, a receipt of a request for the updated location data from another electronic device, and the like.

Prior to transmitting the encrypted location and/or positioning information to the server 108, the electronic device 102 may authenticate with the server 108, such as using credentials (e.g., login, password, token, etc.) of the first user account corresponding to the first user of the electronic device 102. In this manner, only the electronic device 102 (and/or other devices registered to and/or associated with the first user account) are able to transmit (e.g., write) location and/or positioning information corresponding to the first user to/at the server 108. In one or more implementations, alternatively and/or in addition the electronic device 102 may sign the encrypted location information using another private key for which the corresponding public key was previously shared with one or more of the other electronic devices 103-104. In this manner, the other electronic devices 103-104 can use the corresponding public key to confirm that the encrypted location information was signed by an electronic device of the first user.

In one or more implementations, the first user may have multiple devices registered to their user account from which the first user may wish to share their location, such as the electronic device 102 and a companion device (e.g., a smartwatch or other wearable or companion device (not shown)). In this instance, the electronic device 102 may share the second key of the public-private keypair (and/or cryptographic information corresponding thereto and/or cryptographic information from which the second key can be derived) with the companion device, such as by encrypting the second key using a symmetric key (e.g., that is shared with and/or derivable by the companion device) and/or using a public/private keypair specific to the first user account, and transmitting the encrypted second key to the server 108 for storage and subsequent retrieval by the companion electronic device. Since the second key can change over time (as is discussed further below with respect to FIG. 3), the electronic device 102 may transmit each new version of the second key to the server 108 in a similar manner.

The first electronic device 102 may coordinate with the companion device as to when each device should encrypt and transmit location and/or positioning information to the server 108 at any given time. For example, in the instance that the companion device is a smartwatch (and/or other device worn by the first user, the first electronic device 102 may encrypt and transmit the location and/or positioning information when the first electronic device 102 detects that it is in close proximity to the companion device (such as based on detecting the presence of the companion device via a Bluetooth low energy or other peer-to-peer and/or local communication protocol/technology), and the companion electronic device may encrypt and transmit the location and/or positioning information when it detects that the first electronic device 102 is not in close proximity (such as by failing to detect the first electronic device 102 via the Bluetooth low energy and/or other peer-to-peer and/or local communication protocol/technology). Since the second key may change over time (as is discussed further below), the companion device may check for a new version of the second key and/or retrieve the second key prior to each encryption and/or transmission of the location and/or positioning information.

Since the location and/or positioning information is encrypted in the subject system, the subject system allows for the location and/or positioning information to be cached and/or stored on the server 108 without the server 108 being able to access the location and/or positioning information corresponding to the first user (or any other user). Furthermore, the end-to-end encryption of the location and/or positioning information in the subject system prevents intermediate devices and/or other third parties from intercepting and/or accessing the location and/or positioning information corresponding to the first user (or any other user). An example process of end-to-end encryption for location sharing performed by a location sharing electronic device is discussed in more detail below with respect to FIG. 3, and an example process of end-to-end encryption for location sharing performed by a location receiving electronic device is discussed in more detail below with respect to FIG. 4.

Figure 2:
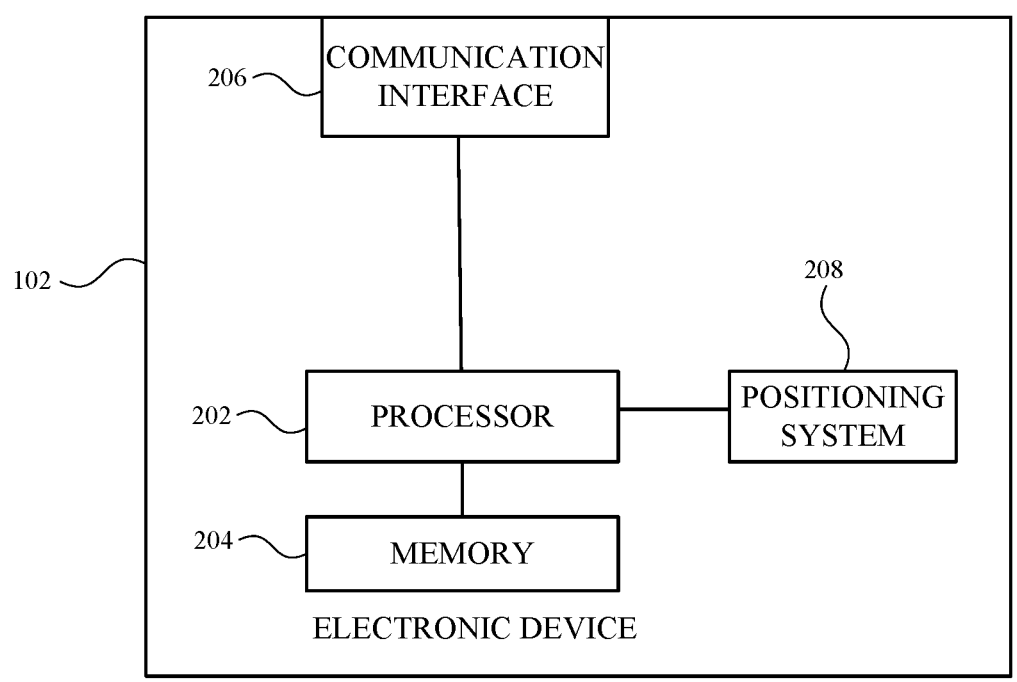
FIG. 2 illustrates an example device that may implement end-to-end encryption for location sharing in accordance with one or more implementations.

FIG. 2 illustrates an example electronic device 102 that may implement end-to-end encryption for location sharing in accordance with one or more implementations. For example, the electronic device 102 of FIG. 2 can correspond to any of the electronic devices 102-104, or to the server 108 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a processor 202, a memory 204, communication interface 206, and a positioning system 208. The processor 202 may include suitable logic, circuitry, and/or code that enable processing data and/or controlling operations of the electronic device 102. In this regard, the processor 202 may be enabled to provide control signals to various other components of the electronic device 102. The processor 202 may also control transfers of data between various portions of the electronic device 102. Additionally, the processor 202 may enable implementation of an operating system or otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The communication interface 206 may include suitable logic, circuitry, and/or code that enables wired or wireless communication, such as between any of the other electronic devices 103-104 and/or the server 108 over the network 106. The communication interface 206 may include, for example, one or more of a Bluetooth communication interface, a cellular communication interface (e.g., 3G, 4G, LTE, 5G, etc.), an NFC interface, a Zigbee communication interface, a WLAN communication interface (e.g., Wi-Fi, WLAN/BT combination, WiMAX, LiFi, 2.4 GHz, 5 GHz, etc.), a USB communication interface, an Ethernet communication interface, a millimeter wave (e.g., 60 GHz) communication interface, or generally any communication interface.

The positioning system 208 may be and/or may include one or more circuits and/or components that are used for determining the location and/or position of the electronic device 102. For example, the positioning system may include a GPS positioning system, a GLONASS positioning system, an accelerometer, an inertial measurement unit (IMU), and/or generally any positioning system and/or any component that may be used by a positioning system to determine a location and/or position of the electronic device 102.

In one or more implementations, one or more of the processor 202, the memory 204, the communication interface 206, the positioning system 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
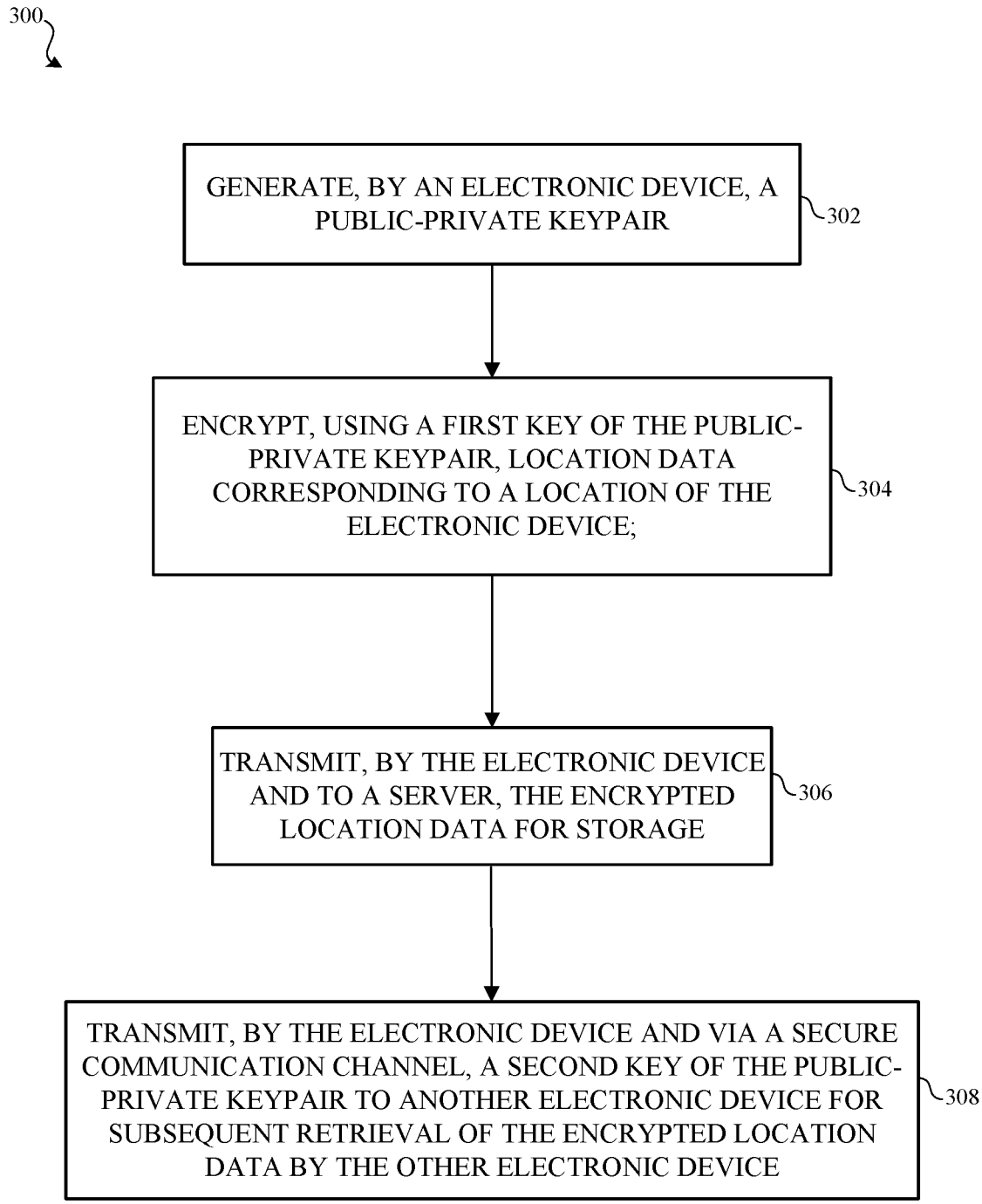
FIG. 3 illustrates a flow diagram of an example process of end-to-end encryption for location sharing performed by a location sharing electronic device in accordance with one or more implementations.

FIG. 3 illustrates a flow diagram of an example process 300 of end-to-end encryption for location sharing performed by a location sharing electronic device in accordance with one or more implementations. For explanatory purposes, the process 300 is primarily described herein with reference to the electronic devices 102, 103 of FIG. 1. However, the process 300 is not limited to the electronic devices 102, 103 of FIG. 1, and one or more blocks (or operations) of the process 300 may be performed by one or more other components of the server 108 and by other suitable devices (e.g., any of the electronic devices 102-104). Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

The process 300 may be initiated when the electronic device 102 (e.g., associated with a first user account of a first user) generates a public-private keypair (302). The electronic device 102 may obtain location data (such as from the positioning system 208), and may encrypt the location data corresponding to the location of the electronic device 102 (304). The electronic device 102 may transmit, to the server 108, the encrypted location data for storage, such as in a dataspace specific to the first user account and/or to which only electronic devices associated with the first user account can store and/or write data (306).

In one or more implementations, prior to transmitting the encrypted location data to the server 108 for storage, the electronic device 102 may authenticate, with the server, using credentials of the first user account. In this manner, the server 108 can ensure that only electronic devices associated with the first user account are able to transmit and/or store encrypted location data corresponding to the first user and/or the first user account.

In one or more implementations, alternatively and/or in addition to authenticating with the server 108, the electronic device 102 may generate another public-private keypair, may transmit, via the secure communication channel, a first key of the other public-private keypair to the other electronic device, may sign, using a second key of the other public-private keypair, the encrypted location data, and may transmit, to the server 108, the signed encrypted location data for storage and subsequent retrieval by the other electronic device 103. In this manner, the other electronic device 103 can use the first key to confirm that any encrypted location data of the first user account that is retrieved from the server 108 was signed with the second key.

The electronic device 102 may then transmit (e.g., synchronously or asynchronously with transmitting the encrypted location data) via a secure communication channel a second key of the public-private keypair to another electronic device 103 for subsequent retrieval of the encrypted location data by the other electronic device 103, wherein the other electronic device 103 may be associated with a second user account that differs from the first user account (308). Thus, the encrypted location data may be stored at the server 108 in a dataspace that can be written to by the electronic device 102 (and/or other electronic devices associated with the first user account) and that can be read from by any other user accounts/electronic devices and/or by user accounts/electronic devices for which the user of the electronic device 102 selected to share their location with. An example process that may then be performed by the other electronic device 103 is discussed further below with respect to FIG. 4.

In one or more implementations, the electronic device 102 may generate and/or transmit the second key of the public-private keypair to the other electronic device is responsive to a triggering event. The triggering event may include, for example, an upgrade to an operating system of the electronic device, a change in membership of a group of electronic devices (and/or user accounts) for which the first user has selected to share their location with, and/or receipt of a request for the second key from the other electronic device 103.

In one or more implementations, responsive to another triggering event (e.g., a change in membership of a group of electronic devices (and/or user accounts) for which the first user has selected to share their location with), the electronic device 102 may generate a new public-private keypair, may encrypt, using a first key of the new public-private keypair, current location data corresponding to a current location of the electronic device, may transmit, to the server 108, the encrypted current location data for storage and subsequent retrieval by the electronic devices 103 (and/or other electronic devices), and may transmit, via the secure communication channel, the second key of the new public-private keypair to the other electronic device 103. The server 108 may replace the previously received encrypted location data for the first user account with the encrypted current location data.

In one or more implementations, the first key may be the private key of the public-private keypair and the second key may be a public key of the public-private keypair. Alternatively, in one or more implementations, the first key may be a public key of the keypair and the second key may be a private key of the keypair.

In one or more implementations, in addition to encrypting the location data, the electronic device may encrypt, using the first key of the public-private keypair, metadata corresponding to the location data and may transmit the encrypted metadata to the server 108 in conjunction with the encrypted location data. The metadata may be, for example, label information corresponding to the location information, such as a name of a point of interest near the location data and/or a label given to the location data by the first user (e.g., home, work, etc.) In one or more implementations, the encrypted location data and the encrypted metadata may be part of an encrypted blob that is transmitted by the electronic device 102 to the server 108 for storage.

In one or more implementations, the electronic device may transmit, to another server and/or to another dataspace at the server 108, the first key (and/or cryptographic information associated therewith) for subsequent retrieval by at least one other electronic device associated with the first user account, such as a companion device, smartwatch, or other wearable device. The other electronic device associated with the first user account may retrieve the first key from the other server, encrypt updated location data using the first key, and transmit the encrypted updated location data to the server for subsequent retrieval by the other electronic device. The electronic device 102 and the other electronic device may coordinate with one another and/or with assistance from a server such that only one of the electronic devices transmits the encrypted location data to the server 108 at any given time.

Figure 4:
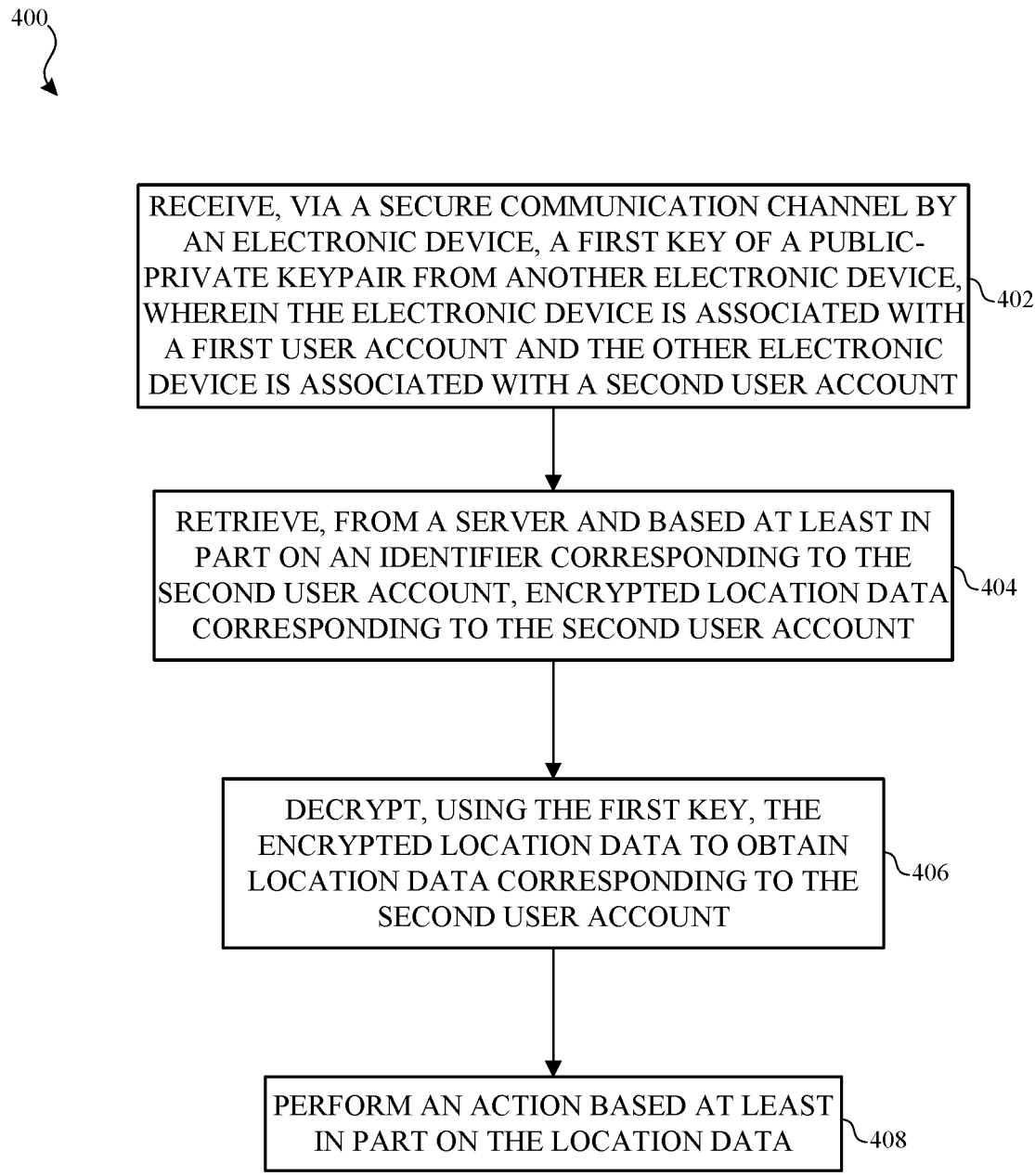
FIG. 4 illustrates a flow diagram of an example process of end-to-end encryption for location sharing performed by a location receiving electronic device in accordance with one or more implementations.

FIG. 4 illustrates a flow diagram of an example process 400 of end-to-end encryption for location sharing performed by a location receiving electronic device 103 in accordance with one or more implementations. For explanatory purposes, the process 400 is primarily described herein with reference to the electronic devices 102, 103 of FIG. 1. However, the process 400 is not limited to the electronic devices 102, 103 of FIG. 1, and one or more blocks (or operations) of the process 400 may be performed by one or more other components of the server 108 and by other suitable devices (e.g., any of the electronic devices 102-104). Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The process 400 may be initiated when the electronic device 103 receives, via a secure communication channel, a first key of a public-private keypair from another electronic device 102, where the electronic device 103 is associated with a first user account and the other electronic device 102 is associated with a second user account that differs from the first user account (402).

The electronic device 103 may retrieve, from the server 108 and based at least in part on an identifier corresponding to the second user account, encrypted location data corresponding to the second user account (404). Thus, the electronic device 103 may have read access rights with respect to the dataspace at the server 108 where the encrypted location data corresponding to the second user account is stored. The identifier of the first user account may be an account identifier, a telephone number, an email address, a token or generally any account identifier.

The electronic device 103 may decrypt, using the first key, the encrypted location data to obtain location data corresponding to the second user account (406), and the electronic device 103 may perform an action based at least in part on the location data (408). The action may be, for example, providing, for display, a representation of the location data, triggering an alert based at least in part on the location data, transmitting a message based at least in part on the location data, or launching an application based at least in part on the location data, or generally any other action.

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

Figure 5:
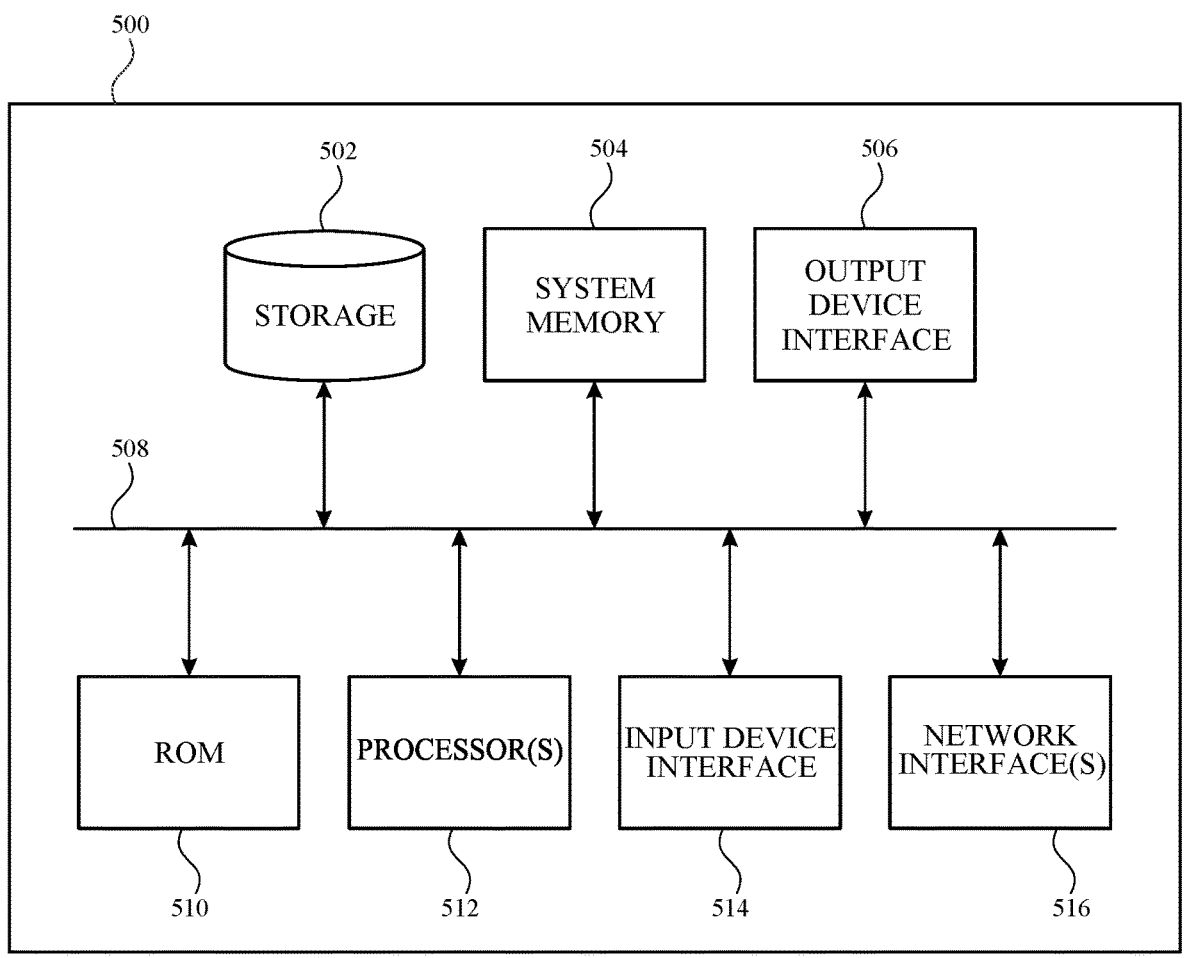
FIG. 5 illustrates an example electronic system with which aspects of the subject technology may be implemented in accordance with one or more implementations.

FIG. 5 illustrates an electronic system 500 with which one or more implementations of the subject technology may be implemented. The electronic system 500 can be, and/or can be a part of, one or more of the electronic devices 102-104, and/or one or the server 108 shown in FIG. 1. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, such as the server 108 shown in FIG. 1, through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
    generating, by an electronic device associated with a first user account, a public-private keypair;
    encrypting, by the electronic device and using a first key of the public-private keypair, location data corresponding to a location of the electronic device;
    transmitting, by the electronic device and to a server, the encrypted location data for storage; and
    transmitting, by the electronic device and via a secure communication channel, a second key of the public-private keypair to another electronic device for subsequent retrieval of the encrypted location data by the other electronic device, wherein the other electronic device is associated with a second user account that differs from the first user account.

2. The method of claim 1, wherein the transmitting, by the electronic device and via the secure communication channel, the second key of the public-private keypair to the other electronic device is performed responsive to a triggering event.

3. The method of claim 2, wherein the triggering event comprises an upgrade to an operating system of the electronic device.

4. The method of claim 2, wherein the other electronic device is part of a group of devices authorized to receive the encrypted location data and the triggering event comprises a change in membership of the group of devices.

5. The method of claim 2, wherein the triggering event comprises receipt of a request for the second key from the other electronic device.

6. The method of claim 1, further comprising:
responsive to a triggering event:
generating, by the electronic device, a new public-private keypair;
encrypting, by the electronic device and using a first key of the new public-private keypair, current location data corresponding to a current location of the electronic device;
transmitting, by the electronic device and to the server, the encrypted current location data for storage; and
transmitting, by the electronic device and via the secure communication channel, the second key of the new public-private keypair to the other electronic device.

7. The method of claim 6, wherein the other electronic device is part of a group of devices authorized to receive the encrypted current location data and the triggering event comprises a change in membership of the group of devices.

8. The method of claim 6, wherein the server is configured to replace the encrypted location data with the encrypted current location data.

9. The method of claim 1, wherein the first key comprises a private key of the public-private keypair and the second key comprises a public key of the public-private keypair.

10. The method of claim 1, wherein the first key comprises a public key of the public-private keypair and the second key comprises a private key of the public-private keypair.

11. The method of claim 1, further comprising:
authenticating, by the electronic device and with the server, credentials of the first user account prior to transmitting, by the electronic device and to the server, the encrypted location data for storage.

12. The method of claim 1, further comprising:
generating, by the electronic device, another public-private keypair;
transmitting, by the electronic device and via the secure communication channel, a first key of the other public-private keypair to the other electronic device;
signing, by the electronic device and using a second key of the other public-private keypair, the encrypted location data; and
transmitting, by the electronic device and to the server, the signed encrypted location data for storage and subsequent retrieval by the other electronic device.

13. The method of claim 1 further comprising:
encrypting, by the electronic device and using the first key of the public-private keypair, metadata corresponding to the location data; and
transmitting, by the electronic device and to the server, the encrypted metadata in conjunction with the encrypted location data.

14. The method of claim 13, wherein the encrypted metadata and the encrypted location data are each part of an encrypted blob that is transmitted to the server for storage.

15. The method of claim 13, wherein the metadata comprises label information corresponding to the location data.

16. The method of claim 1, wherein the secure communication channel comprises an end-to-end encrypted communication channel.

17. The method of claim 1, further comprising:
transmitting, by the electronic device and to another server, the first key for subsequent retrieval by at least one other electronic device associated with the first user account.

18. The method of claim 17, wherein the at least other electronic device associated with the first user account is configured to: retrieve the first key from the other server, encrypt updated location data using the first key, and transmit the encrypted updated location data to the server for subsequent retrieval by the other electronic device.

19. A device comprising:
a memory; and
at least one processor configured to:
receive, via a secure communication channel, a first key of a public-private keypair from another device, wherein the device is associated with a first user account and the other device is associated with a second user account;
retrieve, from a server and based at least in part on an identifier corresponding to the second user account, encrypted location data corresponding to the second user account;
decrypt, using the first key, the encrypted location data to obtain location data corresponding to the second user account; and
perform an action based at least in part on the location data.

20. The device of claim 19, wherein the action comprises at least one of: providing, for display, a representation of the location data, triggering an alert based at least in part on the location data, transmitting a message based at least in part on the location data, or launching an application based at least in part on the location data.

21. A non-transitory machine-readable medium comprising instructions that, when executed by one or more processors, causes the one or more processors to perform operations comprising:
generating, by an electronic device, an encryption key;
encrypting, by the electronic device and using the encryption key, location data corresponding to a location of the electronic device;
transmitting, by the electronic device and to a server, the encrypted location data for storage; and
transmitting, by the electronic device and via a secure communication channel, the encryption key to another electronic device for subsequent retrieval of the encrypted location data by the other electronic device.

* * * * *